US009808953B1

(12) United States Patent
Sagorski

(10) Patent No.: US 9,808,953 B1
(45) Date of Patent: Nov. 7, 2017

(54) SAW BUCK WITH LOG SIZING TEMPLATE

(71) Applicant: Francis A Sagorski, Traverse City, MI (US)

(72) Inventor: Francis A Sagorski, Traverse City, MI (US)

( * ) Notice: Subject to any disclaimer, the term of this patent is extended or adjusted under 35 U.S.C. 154(b) by 399 days.

(21) Appl. No.: 14/717,057

(22) Filed: May 20, 2015

Related U.S. Application Data

(60) Provisional application No. 62/124,609, filed on Dec. 26, 2014.

(51) Int. Cl.

| | |
|---|---|
| ***B23P 19/00*** | (2006.01) |
| ***B27B 17/00*** | (2006.01) |
| ***B25H 1/06*** | (2006.01) |

(52) U.S. Cl.
CPC ........... *B27B 17/0041* (2013.01); *B25H 1/06* (2013.01)

(58) Field of Classification Search
CPC ... B23Q 1/01; B23Q 1/03; B23Q 1/25; B23Q 3/00; B23Q 3/06; B23Q 3/069; B25B 11/00
See application file for complete search history.

(56) References Cited

U.S. PATENT DOCUMENTS

| | | | | |
|---|---|---|---|---|
| 162,799 | A * | 5/1875 | Collins | B27B 17/0041 269/158 |
| 1,287,538 | A * | 12/1918 | Webster | B27B 11/00 83/773 |
| 1,682,671 | A | 8/1928 | Gooding | |
| 1,764,235 | A | 6/1930 | Wilmking | |
| 2,324,196 | A | 7/1943 | Crozier | |
| 3,623,517 | A | 11/1971 | Newmann | |
| 3,830,340 | A | 8/1974 | Schaffel | |
| 3,832,928 | A | 9/1974 | Copeland | |
| 4,062,423 | A | 12/1977 | Armbruster | |
| 4,325,543 | A | 4/1982 | York | |
| 4,437,368 | A | 3/1984 | Bennett | |
| 4,454,929 | A | 6/1984 | Wellman | |
| 4,564,178 | A * | 1/1986 | Steffe | B27B 17/0041 269/133 |
| 4,609,070 | A | 9/1986 | Porps et al. | |
| 4,678,170 | A | 7/1987 | Sampson | |
| 5,143,175 | A | 9/1992 | Tomko | |
| 5,314,041 | A | 5/1994 | Jerrow et al. | |
| 7,140,409 | B2 * | 11/2006 | Leberfinger | B23D 45/12 144/286.1 |
| 7,481,254 | B2 * | 1/2009 | Welsh | B25H 1/04 144/286.1 |
| 8,757,323 | B2 | 6/2014 | Sutton et al. | |
| 2005/0194215 | A1 * | 9/2005 | Radermacher | B23D 47/025 182/181.1 |
| 2008/0302604 | A1 | 12/2008 | Kramer | |

(Continued)

*Primary Examiner* — Lee D Wilson
(74) *Attorney, Agent, or Firm* — Peter Loffler

(57) ABSTRACT

A saw buck has a template for cutting lumber into various desired length pieces. The saw buck uses a pair of front legs each attached to a respective one of a pair of back legs in A-framed configuration with a plate attached to each back leg. The plate has one or more notches and has two or more cradles attached thereto, either between and end of the plate and a notch or between notches. At least some of the log cradles are of different lengths relative to one another and at least some may move laterally relative to one another. A rope if provided for lumber securement.

18 Claims, 5 Drawing Sheets

(56) References Cited

U.S. PATENT DOCUMENTS

| | | | | |
|---|---|---|---|---|
| 2012/0205009 | A1 * | 8/2012 | Barnhill .................. | B25H 1/04<br>144/286.5 |
| 2014/0360332 | A1 | 12/2014 | Schambeck | |

* cited by examiner

SAW BUCK WITH LOG SIZING TEMPLATE

BACKGROUND OF THE INVENTION

1. Field of the Invention

The present invention relates to a saw buck for holding logs to be cut wherein the saw buck has templates for cutting the log into smaller logs of a desired length.

2. Background of the Prior Art

After a tree is felled and its branches are removed, it is often desirable to cut the tree into small logs that can be used for firewood, either as is or split further. The simplest way to accomplish this task is to cut the felled tree right on the ground using a chainsaw. While effective, this method is not without its drawbacks. As the tree is on the ground, it is inevitable that the chainsaw makes ground contact when cutting through the tree, which ground contact dulls the cutting chain of the saw. Additionally, during the cut, the blade of the saw can bind up, creating additional work and slowing the log cutting process.

To address these problems, saw bucks has been proposed. A saw buck, similar to a saw horse, is typically an elongate platform that has means (typically upright or angled stanchions rising from either side of the platform) to hold a log in place with legs located on each end of the platform for support of the platform, the legs being in a generally A-frame configuration (or double A-frame, scissors configuration), being fixed in such configuration or foldable. The platform, by being off of the ground, eliminates the problem of ground contact by the chainsaw. Additionally, as the platform upon which the log rests is flat, the potential for saw blade binding during the cutting process is reduced.

While saw bucks, which come in a variety of architectures, tend to be effective in performing their function, they still have room for improvement. One task of log cutting is to properly size the cut logs to a desired length, which length may vary depending on where the cut logs are to be used. While some people will simply eyeball the cut, hoping to get the guess correct, many log cutters measure each tree and place appropriate markings along the length of the tree whereat cuts are to be make. Marking the tree, while effective, is time-consuming and carries its own problems. If a person misses a cut, that is, the person does not cut at the proper point whereat a mark is located, the error propagates along the remainder of the tree, resulting in cut logs of less than desirable dimensions. Additionally, unless great care is made in placement of the cut marks onto the tree, this log measurement method does not protect against non-straight cuts, again resulting in logs of less that desirable dimensions such as angled ends, which make log splitting difficult as it may be difficult to stand the cut long on its end for such splitting.

Many saw bucks have their stanchions separated from each other at distances that coincide with the desired length of the logs to be cut. However, this occurs as a matter of coincidence and does not provide the ability to cut logs of different lengths depending on the particular needs at hand.

What is needed, is a saw buck that allows a user to be able to quickly and easily cut a tree into smaller logs such that the cut logs are of a desired length, without the need to measure the tree beforehand or to otherwise place cut markings thereon. The saw buck should assist the user in cutting each log generally straight so as to avoid cut logs with angled ends.

SUMMARY OF THE INVENTION

The saw buck with log sizing template of the present invention addresses the aforementioned needs in the art by providing a saw buck onto which a tree or other large log or piece of lumber is placed for cutting. Cradles on the device hold the wood to be cut act as template so that smaller pieces of lumber can be cut, such smaller pieces being of a desired length. The saw buck with log sizing template assists the user in making straight cuts onto the log so as to help avoid having undesired angled ends. The saw buck with log sizing template is of relatively simple design and construction, being produced using standard manufacturing techniques, so as to make the device relatively inexpensive to produce so as to make the saw buck with log sizing template economically attractive to potential consumers for this type of device. The saw buck with log sizing template is easy to set up, use, and maintain.

The saw buck with log sizing template is comprised of a first front leg and a second front leg. A first back leg is attached to the first front leg so as to be oriented in an A-frame configuration (including double A-frame scissors configuration) and a second back leg is attached to the second front leg so as to also be oriented in an A-frame configuration (again including double A-frame scissors configuration). A plate has a first end attached to the first back leg, an opposing second end attached to the second back leg, a first notch disposed between the first end and the second end, and possibly a second notch (at least one second notch) disposed between the first notch and the second end. A first log cradle is attached to the plate between the first end and the first notch, the first log cradle having a first longitudinal length. A second log cradle is attached to the plate between the first notch and the second end, the first log cradle having a second longitudinal length. If the plate has more than one notch, then a third log cradle is attached to the plate between the first notch and the second notch. The first longitudinal length of the first log cradle is different relative to the second longitudinal length of the second log cradle. The first log cradle is supported by the first back leg, the second log cradle is supported by the second back leg a post attached to the plate and if more than two log cradles are provided, the third log cradle is supported by a post attached to the plate. The first back leg is pivotally attached to the first front leg and the second back leg is pivotally attached to the second front leg. A support shelf is attached to the first front leg and the second front leg. At least one strap is attached to the plate. The first log cradle is laterally displaceable relative to the second log cradle.

BRIEF DESCRIPTION OF THE DRAWINGS

Similar reference numerals refer to similar parts throughout the several views of the drawings.

DESCRIPTION OF THE PREFERRED EMBODIMENT

Figure 1:
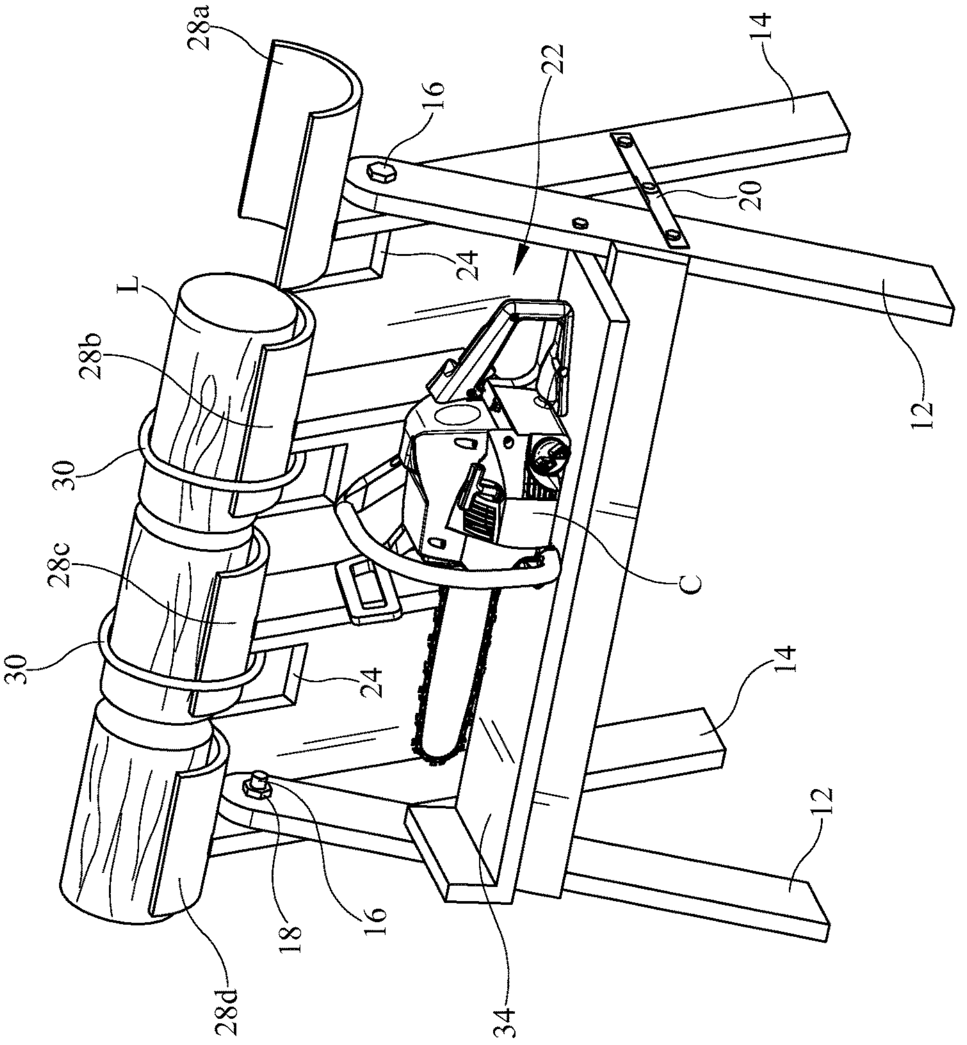
FIG. 1 is a perspective view of the saw buck with log sizing template of the present invention.
Figure 2:
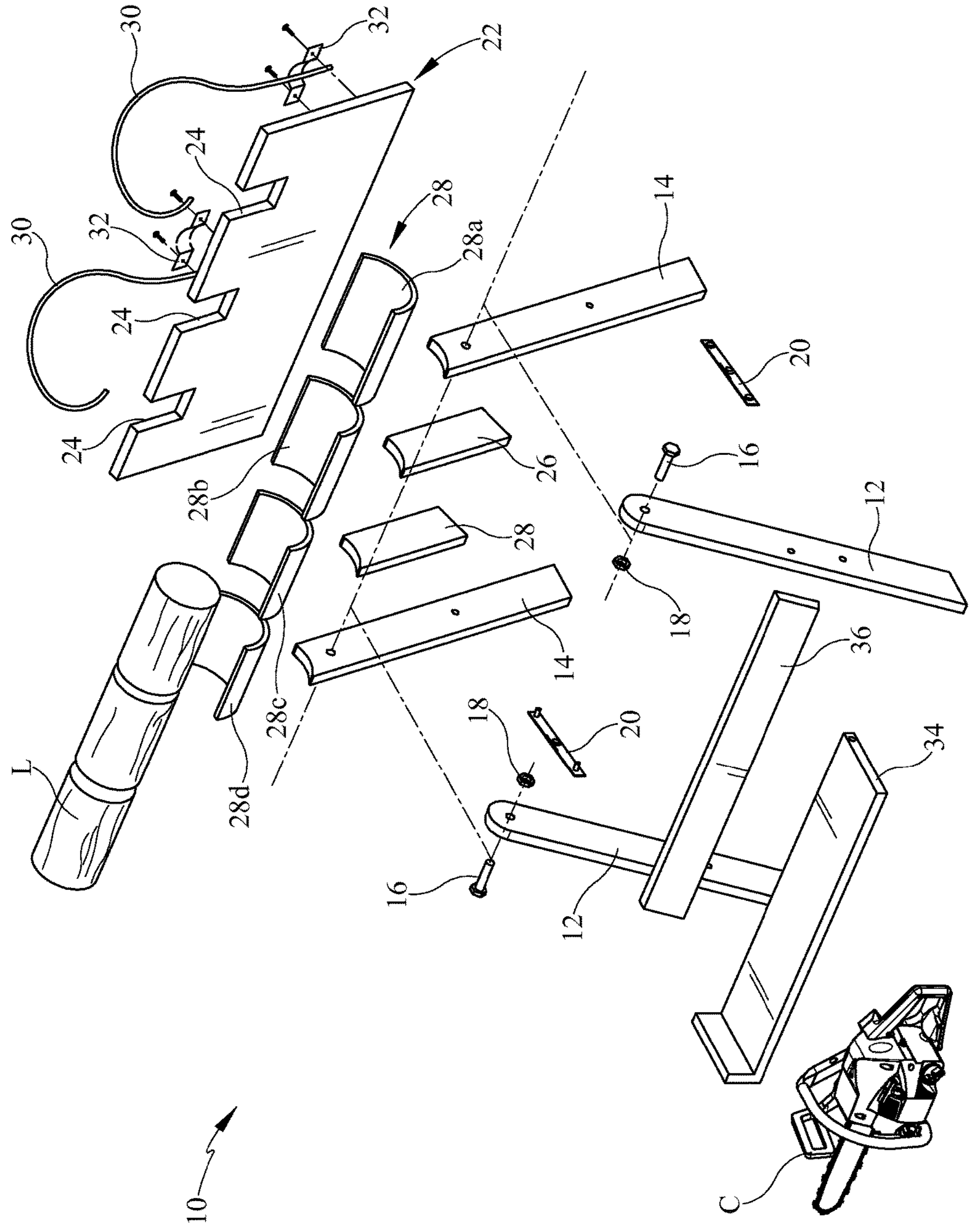
FIG. 2 is an exploded perspective view of the saw buck with log sizing template.
Figure 3:
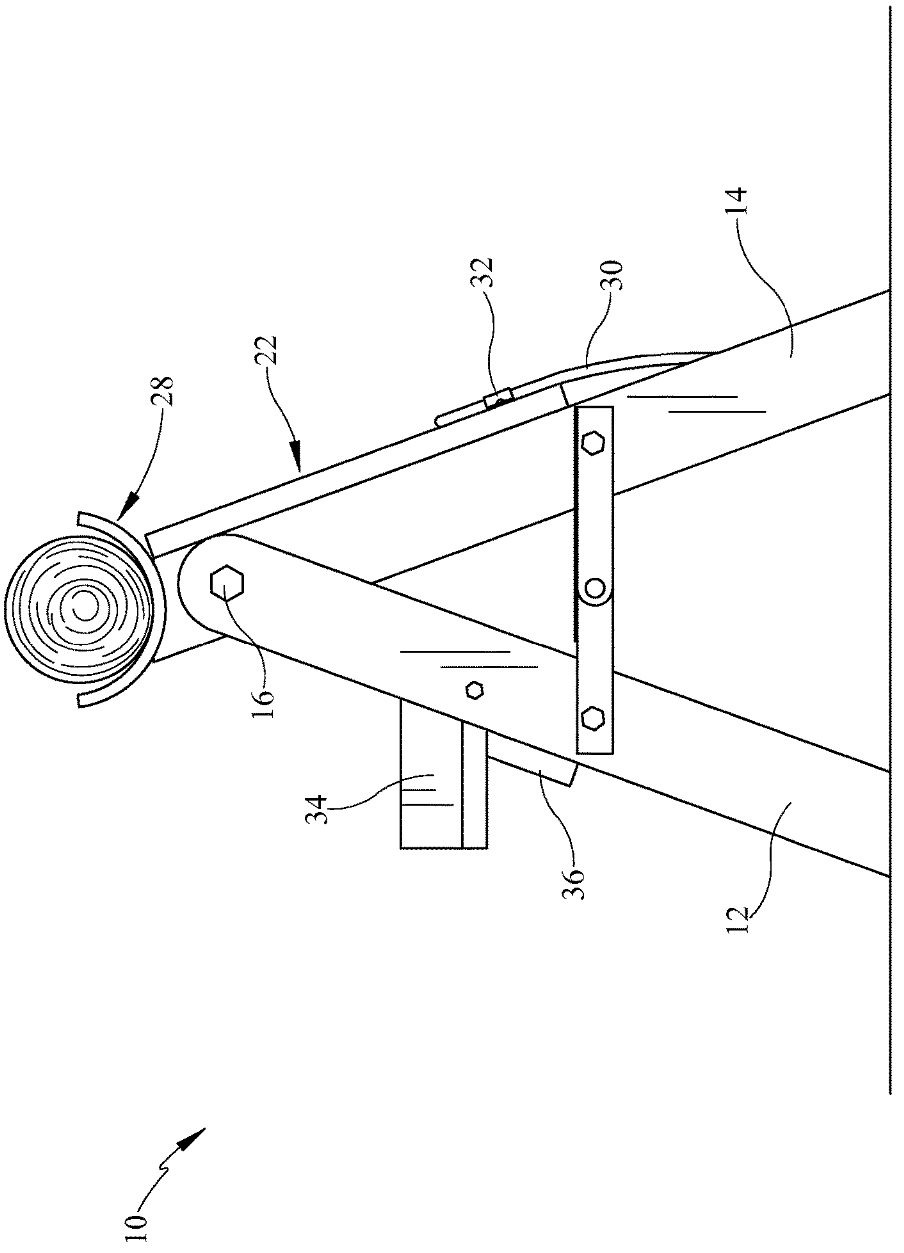
FIG. 3 is an end view of the saw buck with log sizing template.
Figure 4:
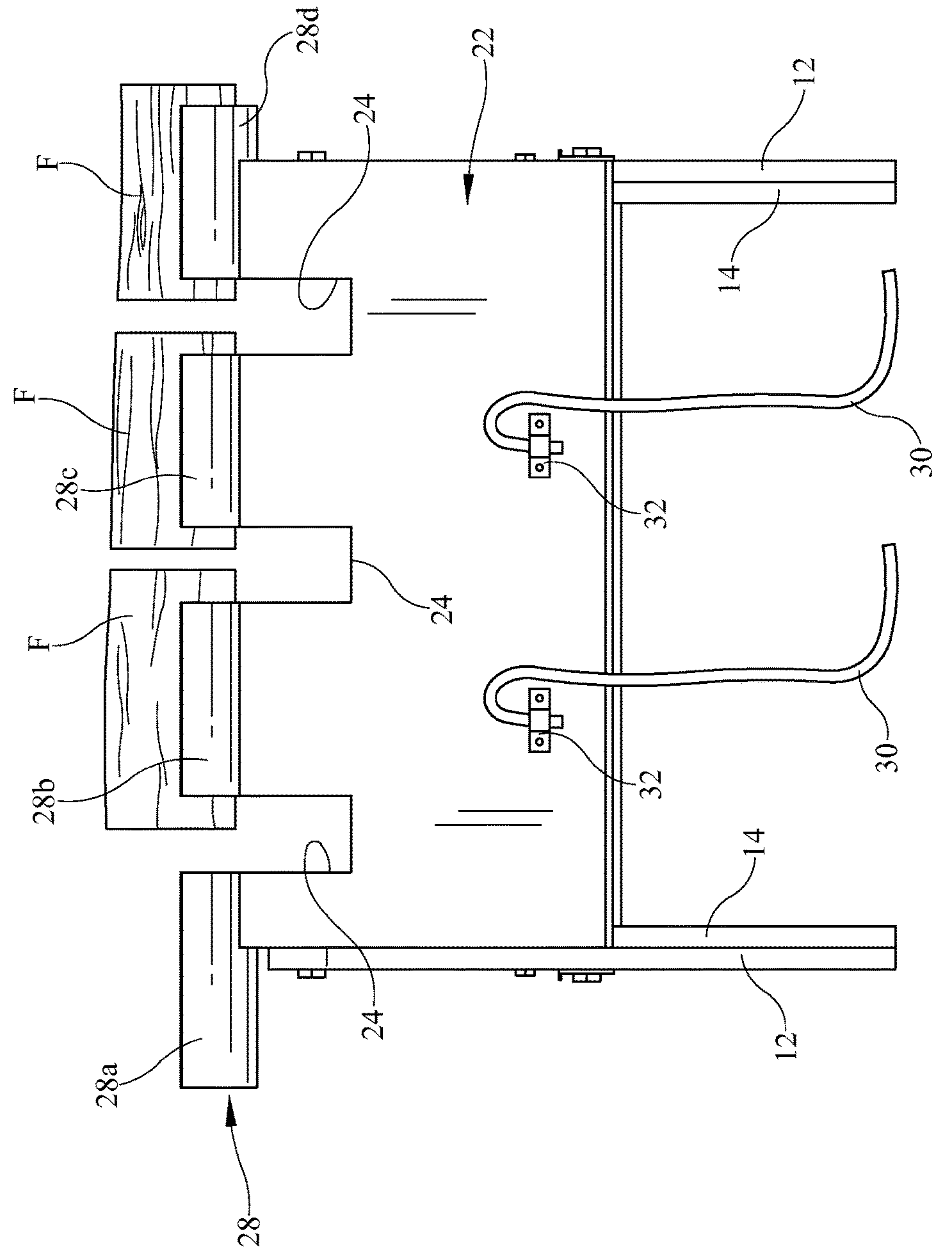
FIG. 4 is a back view of the saw buck with log sizing template.

Referring now to the drawings, it is seen that the saw buck with log sizing template of the present invention, generally denoted by reference numeral 10, is comprised of a pair of front legs 12 and a pair of back legs 14. A front leg 12 and a back leg 14 at located at each end of the saw buck with log sizing template 10. The front leg 12 and the back leg 14 at an end of the saw buck with log sizing template 10 are pivotally attached to one another in appropriate fashion such as via the illustrated bolt 16 and nut 18 so that the two legs 12 and 14 can fold out with respect to one another into an A-frame orientation (including a double A-frame configuration when the two legs 12 and 14 are attached to one another medially in scissors-like fashion) for use and support of the saw buck with log sizing template 10 and fold back to be at least somewhat coextensive with one another for storage and transport of the saw buck with log sizing template 10. When the pair of legs 12 and 14 are spread apart from one another, the legs 12 and 14 are locked in such configuration with an appropriate locking spreader 20 attached to the medial portion of each leg 12 and 14 as is well known in the art. Of course the legs can be configured to be continuously spread apart using appropriate brackets (not illustrated) for such configuration, as is well known in the art or can be generally vertically oriented without being attached to one another.

A back plate 22 having one or more notches 24 is attached to each of the back legs 14 at each end of the saw buck with log sizing template 10 in appropriate fashion, such as via appropriate screws, welding, adhesive, etc., depending on the material used to construct the back legs 14 and the back plate 22. Support posts 26 are attached to the back plate 22 between each adjacent notch 24 on the back plate 22, such that the tops of the posts 26 are located at the same height as the tops of the back legs 14, whenever the back legs 14 are in a spread configuration—in a very simple configuration of the saw buck with log sizing template, the back plate has only a single notch so that no posts would be used.

Attached to the back plate 22 in appropriate fashion is a series of log cradles 28*a*, 28*b*, 28*c*, and 28*d* (generally denoted as reference number 28) such that each log cradle 28 is supported by the top of either one of the back legs 14 or the top of one of the posts 26 depending on the position of the respective log cradle 28 along the back plate 22. As seen, the log cradles 28 may be generally rounded so that the tops of the back legs 14 and the tops of the posts 26 are also rounded to correspond to the shape of the outer surface of the respective log cradle 28 which the back leg 14 or post 26 supports. The log cradles may have different shapes such as a squared U-shape, a V-shape, etc., with the shape of the tops of the back legs and the shape of the tops of the posts being adjusted to correspond to such shape of the outer surface of the log cradle which sits upon either a back leg or a post. Each log cradle 28 is of a different length (or at least some of the log cradles 28 are of a different length relative to other log cradles 28). As seen, the spacings between the log cradles 28 correspond to the notches 24 in the back plate 22.

One or more ropes 30 or other securement straps are attached to the back plate 22 in appropriate fashion such as via the illustrated securement brackets 32, the number of ropes 30 being dependent on the overall length of the saw buck with log sizing template 10.

As seen, a support shelf 34 is attached to each of the front legs 12 in appropriate fashion, either fixedly, or pivotally allowing the support shelf 34 to pivot up and out of the way during saw buck with log sizing template 10 storage. The support shelf 34 can hold various items needed by a user, such as a chain saw C. A support brace 36 is attached to each of the front legs 12 in appropriate fashion just below the support shelf 34 in order to provide stability to the saw buck with log sizing template 10 as well as support the support shelf 34 when the support shelf 334 is in the unfolded position.

In order to use the saw buck with log sizing template 10, the legs 12 and 14 of the device are unfolded (if so configured) in appropriate fashion and locked into such unfolded configuration via the locking spreaders 20. A log L is placed onto the log cradles 28 to be supported thereon. The log L is cut at the desired location(s) depending on the desired length of the resulting cut log F. For example, if a cut log F having a desired length that corresponds to the longitudinal length of the right most log cradle 28*a* in FIG. 1 is needed, then the end of the log L to be cut is positioned to be flush with the outer end of this log cradle 28*a* and a single cut is made into the log L to be cut between this log cradle 28*a* and the adjacent log cradle 28*b* so that the cut log F has the same length as this log cradle 28*a*, the edge of the rightmost log cradle 28*a* acting as a guide to assure a straight cut. Once the log L is cut through, the saw C drops into the notch 24 between the two log cradles 28*a* and 28*b* so as not to encounter the back plate 22 proper—if the end of the log L to be cut is not initially placed flush with the outer end of the rightmost log cradle 28*a*, then the log L is additionally cut right at the outer end of this log cradle 28*a*, this outer end also acting as a guide for the saw to assure a straight cut. The log L to be cut can then be moved as desired for the next cut—new end of log to be cut is positioned at the outer end of the rightmost log cradle 28*a* and a cut is made into the log between the rightmost log cradle 28*a* and the adjacent log cradle 28*b*. Of course, in the above example, a cut can be placed elsewhere such as between the second log cradle 28*b* and the third log cradle 28*c* in proceeding from right to left in FIG. 1. The ropes 30 can be used to help hold the log to be cut L stable during the cutting process. Of course, the two log cradles 28 being used for sizing need not necessarily be adjacent one another.

Figure 5:
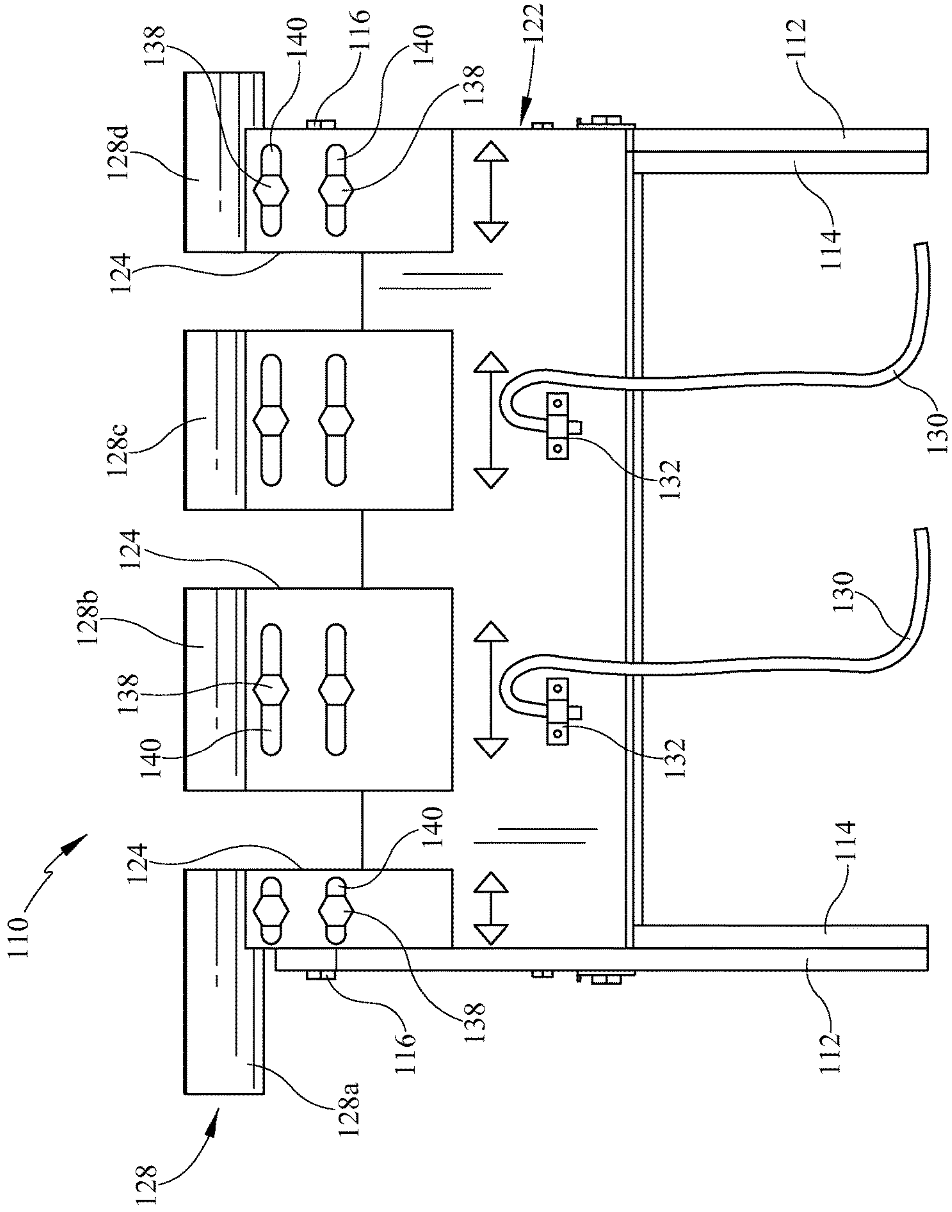
FIG. 5 is a back view of an alternate embodiment of the saw buck with log sizing template of the present invention.

As seen in FIG. 5, in an alternate embodiment of the saw buck with log sizing template 110, the saw buck with log sizing template 110 is substantially the same as the above-described saw buck with log sizing template 10 by having a front leg 112 and a back leg 114 located at each end of the saw buck with log sizing template 110. The front leg 112 and the back leg 14 at an end of the saw buck with log sizing template 110 are pivotally attached to one another in appropriate fashion such as via the illustrated bolt 116 and nut (not illustrated) so that the two legs 112 and 141 can fold out with respect to one another into an A-frame orientation (or double A-frame configuration) for use and support of the saw buck with log sizing template 110 and fold back to be at least somewhat coextensive with one another for storage and transport of the saw buck with log sizing template 110. When the pair of legs 112 and 114 are spread apart from one another, the legs 112 and 114 are locked in such configuration with an appropriate locking spreader (not illustrated) is attached to the medial portion of each leg 112 and 114 as is well known in the art. Of course the legs can be configured to be continuously spread apart using appropriate brackets (not illustrated) for such configuration, as is well known in the art or can be generally vertically oriented without being attached to one another.

A back plate 122 having a series of notches 124 is attached to each of the back legs 114 at each end of the saw buck with log sizing template 110 in appropriate fashion, such as via appropriate screws, welding, adhesive, etc., depending on the material used to construct the back legs 114 and the back plate 122. Support posts are attached to the back plate 122 between each adjacent notch 124 on the back plate 122, such that the tops of the posts are located at the same height as the tops of the back legs 114, whenever the back legs 114 are in a spread configuration—in a very simple configuration of the saw buck with log sizing template, the back plate has only a single notch so that no posts would be used.

Attached to the back plate 122 is a series of log cradles 128*a*, 128*b*, 128*c*, and 128*d* (generally denoted as reference number 128) such that each log cradle 128 sits upon and is supported by the top of either one of the back legs 114 or the top of one of the posts 126 depending on the position of the respective log cradle 128 along the back plate 122. As seen, appropriate bolts 138 (with corresponding appropriate nuts (not illustrated), which nuts may be countersunk within the log cradles 128) are used to attach each log cradle 128 to the back plate 122 such that the bolts 138 pass through a horizontally disposed channel 140 on the log cradle 128 thereby allowing the lateral position of the log cradle 128 with respect to the back plate 122 to vary. Of course, not all of the log cradles 128 need to have lateral movement capability so that some of the log cradles 128 may be fixedly attached to the back plate 122. The log cradles 128 may be generally rounded so that the tops of the back legs 114 and the tops of the posts are also rounded to correspond to the shape of the outer surface of the respective log cradle 128 which the back leg 114 or post 126 supports. The log cradles may have different shapes such as a squared U-shape, a V-shape, etc., with the shape of the tops of the back legs and the shape of the tops of the posts being adjusted to correspond to such shape of the outer surface of the log cradle. Each log cradle 128 may be of a different length (or at least some of the log cradles 128 are of a different length relative to other log cradles 128). The spacings between the log cradles 128 continue to correspond to the notches 124 in the back plate 122, irrespective of the precise position of the log cradles 128 when laterally varied.

One or more ropes 130 or other securement straps are attached to the back plate 122 in appropriate fashion such as via the illustrated securement brackets 132, the number of ropes 130 being dependent on the overall length of the saw buck with log sizing template 110.

A support platform and support brace (neither illustrated) may also be provided.

In order to use the saw buck with log sizing template 110, the legs 112 and 114 of the device are unfolded (if so configured) in appropriate fashion and locked into such unfolded configuration via the locking spreaders. If needed, one or more of the log cradles 128 is laterally shifted by loosening its bolts 138, laterally repositioning the log cradle 128, and thereafter tightening the bolt 138 so as to have the desired distances between ends of a pair of the log cradles 128. A log L is placed onto the log cradles 128 to be supported thereon. The log L is cut at the desired location(s) depending on the desired length of the resulting cut log F. For example, if a cut log having desired a length that is two inches longer than the distance between the outer end of the leftmost most log cradle 128*a* and the outer end (the end facing the leftmost log cradle 128*a*) of the adjacent log cradle 128*b* in FIG. 5, either the leftmost log cradle 128*a* is moved to the left 2 inches or the adjacent log cradle 128*b* is moved right two inches (or a combination if neither log cradle can move the entire two inches) and the end of the log L to be cut is positioned to be flush with the outer end of the leftmost log cradle 128*a* and a single cut is made into the log to be cut at the outer end of the adjacent log cradle 128*b* so that the cut log F has the same length as distance between the outer end of the leftmost log cradle 128*a* and the outer end of the adjacent log cradle 128*b*. Once the log L is cut through, the saw drops into the notch 124 between the two log cradles 128*a* and 128*b* so as not to encounter the back plate 122 proper—if the end of the log L to be cut is not initially placed flush with the outer end of the leftmost log cradle 128*a*, then the log L is additionally cut right at the outer end of this log cradle 128*a*. The log to be cut can then be moved as desired for the next cut—new end of log to be cut is positioned at the outer end of the leftmost log cradle 128*a* and a cut is made into the log at the outer end of the adjacent log cradle 128*b*. Of course, the two log cradles 128 being used for sizing need not necessarily be adjacent one another.

While the invention has been particularly shown and described with reference to an embodiment thereof, it will be appreciated by those skilled in the art that various changes in form and detail may be made without departing from the spirit and scope of the invention.

I claim:

1. A saw buck comprising:

a first front leg and a second front leg;

a first back leg attached to the first front leg and a second back leg attached to the second front leg;

a plate having a first end and an opposing second end, the first end attached to the first back leg and the second end attached to the second back leg, the plate also having a notch disposed between the first end and the second end;

a first log cradle attached to the plate between the first end and the notch, the first log cradle having a first longitudinal length, the first log cradle sits upon and is supported by the first back leg and the second log cradle sits upon and is supported by the second back leg; and a second log cradle attached to the plate between the second end and the notch, the first log cradle having a second longitudinal length.

2. The saw buck as in claim 1 wherein the first longitudinal length is different relative to the second longitudinal length.

3. The saw buck as in claim 1 wherein the first back leg is pivotally attached to the first front leg and the second back leg is pivotally attached to the second front leg.

4. The saw buck as in claim 1 further comprising a support shelf attached to the first front leg and to the second front leg.

5. The saw buck as in claim 1 further comprising a strap attached to the plate.

6. The saw buck as in claim 1 wherein the first log cradle is laterally displaceable relative to the second log cradle.

7. A saw buck comprising:

a first front leg and a second front leg;

a first back leg attached to the first front leg and a second back leg attached to the second front leg;

a plate having a first end and an opposing second end, the first attached to the first back leg and the second end attached to the second back leg, the plate also having a first notch disposed between the first end and the second end and a second notch disposed between the first notch and the second end;

a first log cradle attached to the plate between the first end and the first notch, the first log cradle having a first longitudinal length;

a second log cradle attached to the plate between the first notch and the second notch, the second log cradle having a second longitudinal length; and a third log cradle attached to the plate between the second notch and the second end.

8. The saw buck as in claim 7 wherein the first longitudinal length is different relative to the second longitudinal length.

9. The saw buck as in claim 7 wherein the first log cradle sits upon and is supported by the first back leg, the second log cradle sits upon and is supported by a post attached to the plate, and the third log cradle sits upon and is supported by the second back leg.

10. The saw buck as in claim 7 wherein the first back leg is pivotally attached to the first front leg and the second back leg is pivotally attached to the second front leg.

11. The saw buck as in claim 7 further comprising a support shelf attached to the first front leg and to the second front leg.

12. The saw buck as in claim 7 further comprising a strap attached to the plate.

13. The saw buck as in claim 7 wherein the first log cradle is laterally displaceable relative to either the second log cradle or to the third log cradle.

14. A saw buck comprising:

a first front leg and a second front leg;

a first back leg pivotally attached to the first front leg and a second back leg pivotally attached to the second front leg;

a plate having a first end and an opposing second end, the first end attached to the first back leg and the second end attached to the second back leg, the plate also having a notch disposed between the first end and the second end;

a first log cradle attached to the plate between the first end and the notch, the first log cradle having a first longitudinal length; and a second log cradle attached to the plate between the second end and the notch, the first log cradle having a second longitudinal length.

15. The saw buck as in claim 1 wherein the first longitudinal length is different relative to the second longitudinal length.

16. The saw buck as in claim 1 further comprising a support shelf attached to the first front leg and to the second front leg.

17. The saw buck as in claim 1 further comprising a strap attached to the plate.

18. The saw buck as in claim 1 wherein the first log cradle is laterally displaceable relative to the second log cradle.

* * * * *